Feb. 19, 1946.　　　　L. E. SMITH　　　　2,395,350
PLANTER
Filed March 22, 1943　　　4 Sheets-Sheet 1

Feb. 19, 1946.      L. E. SMITH      2,395,350
PLANTER
Filed March 22, 1943      4 Sheets-Sheet 2

Inventor:
Lewis E. Smith,
By Paul O. Pippel
Attorney.

Feb. 19, 1946.  L. E. SMITH  2,395,350
PLANTER
Filed March 22, 1943  4 Sheets-Sheet 3
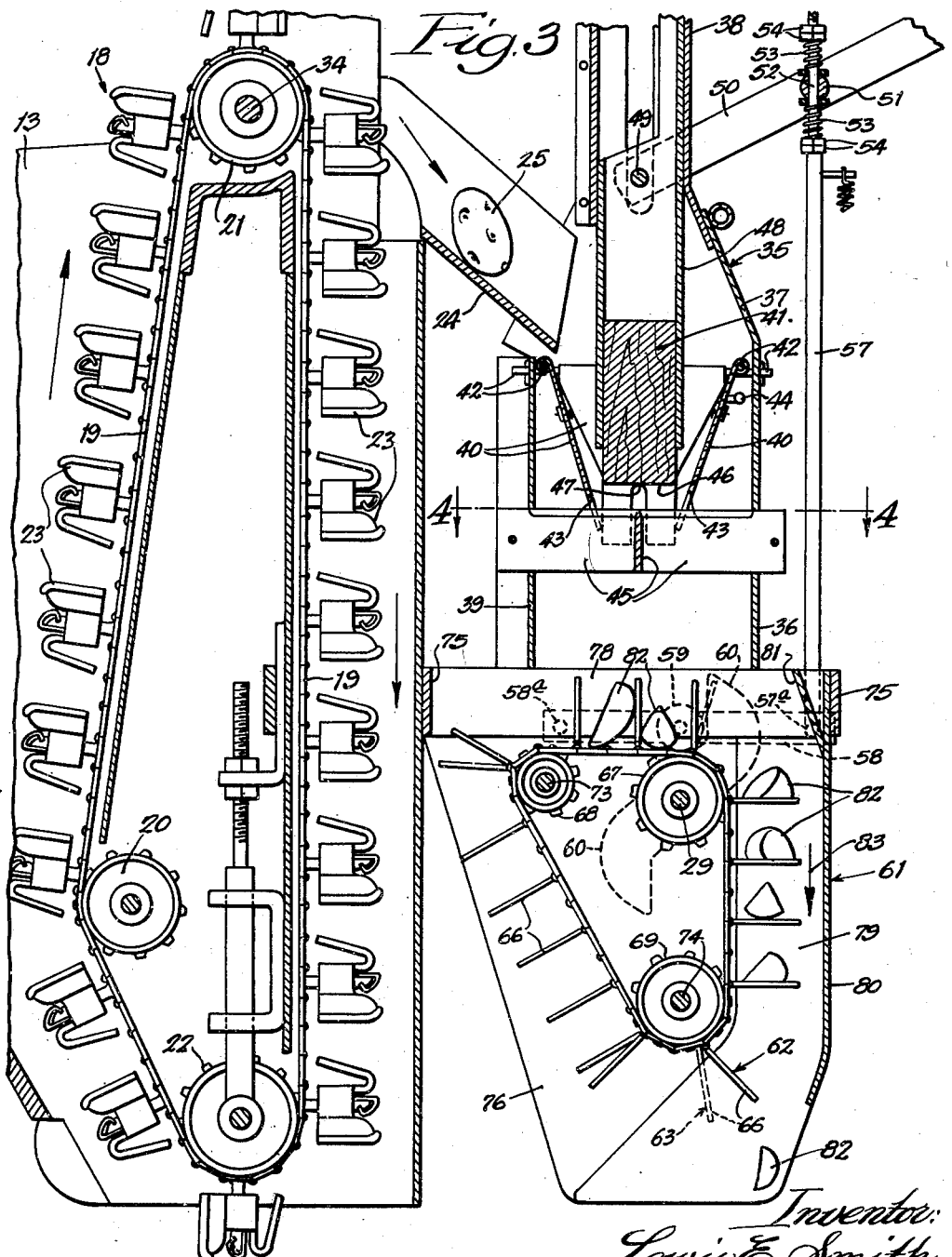
Inventor:
Lewis E. Smith,
By Paul O. Pippel
Attorney.

Feb. 19, 1946. L. E. SMITH 2,395,350
PLANTER
Filed March 22, 1943 4 Sheets-Sheet 4
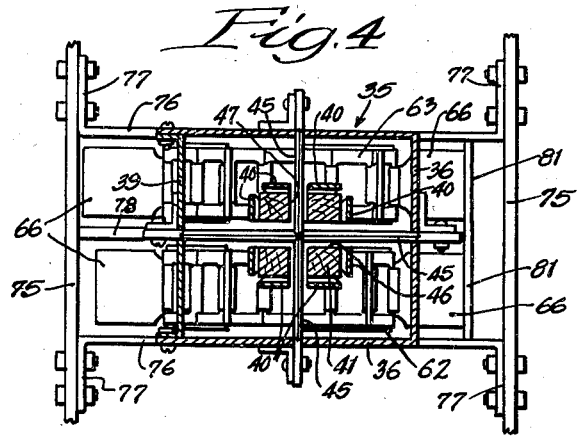
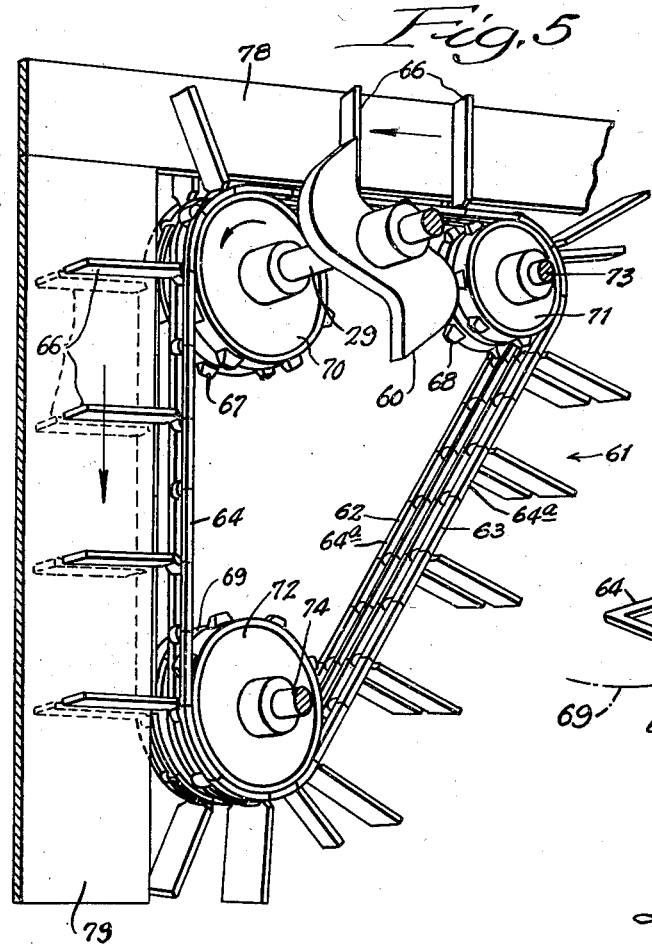
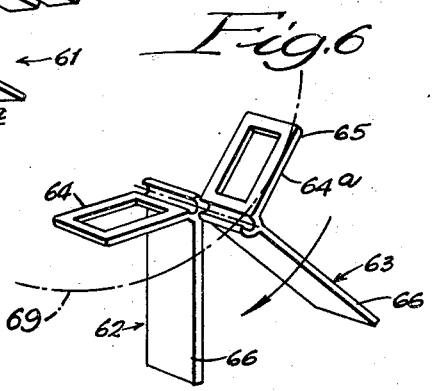
Inventor:
Lewis E. Smith,
By Paul O. Pippel
Attorney.

Patented Feb. 19, 1946

2,395,350

UNITED STATES PATENT OFFICE 2,395,350

PLANTER

Lewis E. Smith, Congress Park, Ill., assignor to International Harvester Company, a corporation of New Jersey Application March 22, 1943, Serial No. 480,011

27 Claims. (Cl. 146—59)

This invention relates to a planter. More specifically it relates to a planter of the type which cuts seeds into parts and deposits the parts on the ground.

In planters for potatoes and similar crops, it is important to obtain a good spacing between the seeds, and this is true whether the seeds are whole or are divided into parts. In some cases it is desirable to plant the seeds in staggered relation. It is a difficult thing to obtain satisfactory spacing in most planters of known type, since these planters generally drop the seeds from a considerable height through tubes. The time required for the seeds to fall through the tubes may vary, and this will result in uneven spacing of the seeds. The present application is concerned with overcoming these difficulties.

An object of the present invention is to provide an improved planter.

A further object is the provision of a planter which cuts the seeds into parts.

Another object is to provide an improved planter for depositing seeds in proper spaced relation.

Still another object is the provision of a planter which cuts seeds into parts and deposits them in spaced relation.

A further object is to provide a planter which receives seeds or parts thereof in side-by-side relation and deposits them in proper spaced relation.

A still further object is to provide an improved conveying means.

Still another object is the provision of an improved conveying means for receiving articles in side-by-side relation and depositing them in spaced relation.

Another object is to provide a pair of juxtaposed conveyers which have compartments in side-by-side relation at a receiving point and in staggered relation at a discharge point.

A further object is to provide a conveying means for receiving cut seed directly from a cutter and conveying it to the ground.

Other objects will appear from the disclosure.

According to the present invention, there is provided a pair of conveyers immediately adjacent a seed-cutting mechanism, the conveyers serving to receive cut seed parts directly from the cutting mechanism in side-by-side relation and to deposit the cut seed parts upon the ground in spaced relation.

In the drawings:

Figure 3 is a vertical sectional view taken along the line 3—3 of Figure 1;

Figure 4 is a horizontal sectional view taken along the line 4—4 of Figure 3;

Figure 5 is a perspective view of the novel conveying means of the present inveniton;

Figure 6 is a perspective view of two adjacent links of the conveying means;

Figure 7 is a vertical sectional view of a first modified form of conveying means; and Figure 8 is a vertical sectional view of a second modified form of conveying means.

Figure 1:
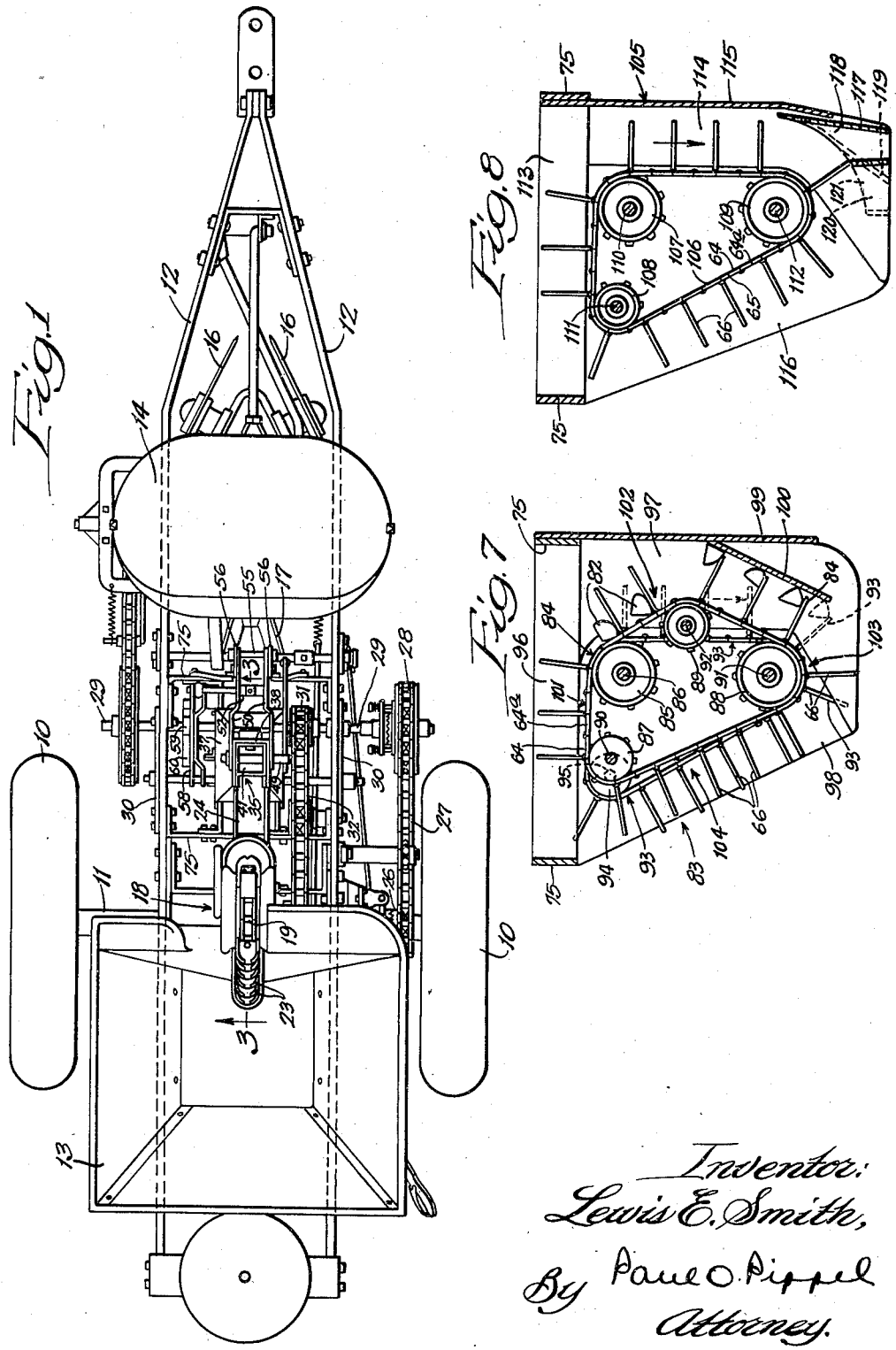
Figure 1 is a plan view of the planter of the present invention.
Figure 2:
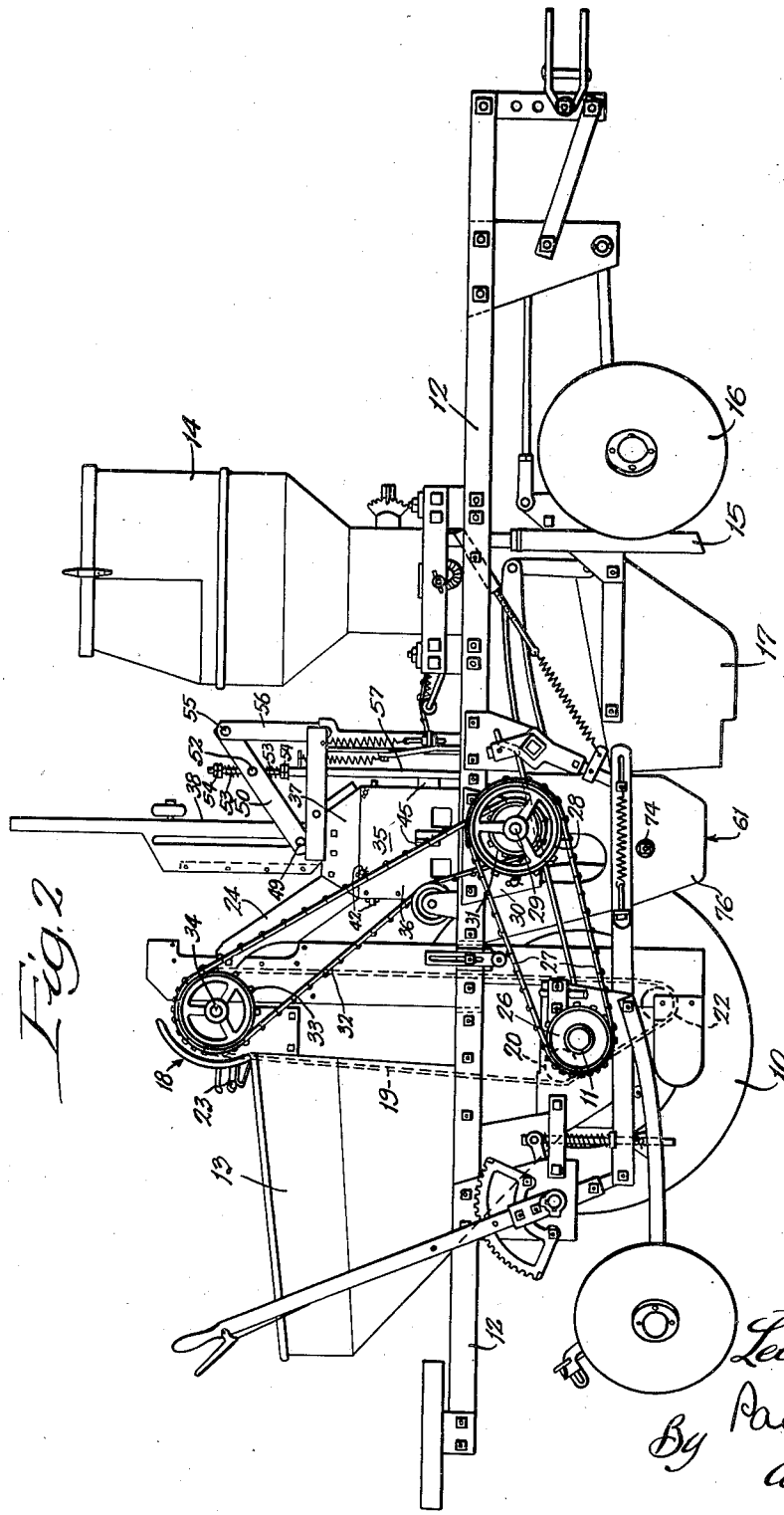
Figure 2 is a side view of the planter.

The planter shown in Figures 1 and 2 comprises a pair of carrying wheels 10, an axle 11, a pair of longitudinal frame members 12, a seed hopper 13, and a fertilizer hopper 14. A tube 15 extends downwardly from the fertilizer hopper 14 for discharging fertilizer upon the ground. Positioned in front of the tube 15 is a pair of angularly related disks 16, which furrow the ground for the fertilizer deposited by the tube 15. Positioned behind the fertilizer tube 15 is a furrow opener 17 which is to make a furrow in which seeds originally in the seed hopper 13 are deposited. As shown in Figure 3, a vertically disposed seed dispenser 18 is provided. This device comprises a sprocket chain 19, three sprockets 20, 21, and 22 over which the chain 19 is trained, and a plurality of seed-receiving members 23 fixed to the chain 19. The seed-dispensing mechanism 18 is driven in the direction of the arrows in Figure 3 and carries whole potatoes upwardly in the seed-receiving members 23 and discharges them down a chute 24. A whole potato 25 is shown in the chute 24.

Secured to the axle 11 is a sprocket 26 engaged by a sprocket chain 27, which in turn engages a sprocket 28 secured to a shaft 29. The shaft 29 extends across the planter and is journaled in plates 30 secured to and depending from the longitudinal frame members 12. A sprocket 31 is secured upon the shaft 29 and is engaged by a sprocket chain 32, which in turn engages a sprocket 33 secured to a shaft 34. The upper sprocket 21 of the seed-dispensing mechanism 18 is also secured upon the shaft 34, and so the seed-dispensing mechanism 18 is driven from the axle 11 through the sprockets 26, 28, 31, and 33, sprocket chains 27 and 32, and the shafts 29 and 34.

The whole potato 25 falls down the chute 24 into a seed-cutting mechanism 35. This mechanism includes a U-shaped shell 36 having an upper hood portion 37 and a slide portion 38, a channel member 39 secured within the ends of the U-shaped shell 36, four spring-urged pivoted members 40, and a cutter-head 41. The members 40 are pivoted upon rods 42 supported in the U-shaped member 36 and the channel 39. The lower ends are slotted, as indicated at 43, and are urged toward one another by spring means 44 which surround the members 40. Secured within the U-shaped member 36 and the channel 39 is a pair of intersecting blades 45 which pass through the slotted portions 43 of the members 40. The cutter-head 41 has intersecting slots 46 and 47 which permit the cutter-head to be brought down upon the intersecting blades 45, as shown in Figure 3. The cutter-head 41 is secured within a slide 48 which is adapted to reciprocate within the slide portion 38 of the U-shaped member 36. A pin 49 passes through opposite sides of the slide 48 and serves to pivotally connect a pair of arms 50 to the slide 48. Pivotally connected between the arms 50 is a slotted ball 51 through which a threaded rod 52 extends. There is placed upon the rod 52 opposed springs 53 which tend to hold the slotted ball 51 in the central position shown in Figure 3 between nuts 54 threaded upon the rod 52. The arms 50 are pivoted at 55 upon an upright 56. The threaded rod 52 is secured to the upper end of a larger rod 57 pivoted at its lower end at 57ª on a member 58. The member 58 is pivoted at 58ª on one of a pair of members 76 to be described presently and carries a follower 59 engaging a cam 60 secured upon the shaft 29. Rotation of the axle 11 acts through the sprocket chain 27 and the shaft 29 to rotate the cam 60. The cam 60 causes the follower 59 to be raised twice and drop twice during each revolution of the shaft 29, and this causes a similar raising and dropping of the cutter-head 41 upon the intersecting blades 45. Each time that the cutter-head 41 is raised, a whole potato 25 falls into the members 40, which serve to center the seed over the intersection of the blades 45, and the cutter-head 41 thereafter descends and cuts the seed 25 into four parts. The aforementioned seed-cutting mechanism and seed-dispensing mechanism are not new with the present applicant and form per se no part of the present invention.

Positioned below the seed-cutting mechanism 35 is a conveying means 61 illustrated in Figures 5 and 6, which receives the cut seed parts directly from the seed-cutting mechanism and deposits them upon the ground. This conveying means comprises essentially a conveyor 62 and a conveyor 63. The conveyors 62 and 63 are each formed of links 64 and 64ª. Each link 64 is formed of a connecting body portion 65 and an upstanding body portion 66 at one end thereof. Each link 64ª has only a body portion similar to the body portion 65 of the link 64 and has no upstanding portion. Thus there is an upstanding portion 66 for each two conveyor links, and there is formed a seed-receiving compartment for each two links. The conveyor 62 is trained about sprockets 67, 68, and 69, and the conveyor 63 is trained around sprockets 70, 71, and 72. The sprockets 67 and 70 are secured upon the shaft 29 and serve to drive the conveyors 62 and 63. The sprockets 68, 69, 71, and 72 are idler sprockets. The sprockets 68 and 71 are mounted upon a shaft 73 and the sprockets 69 and 72 upon a shaft 74. Transverse frame members 75 are secured by flanged ends to the longitudinal frame members 12. Sheet members 76 have flanged ends 77 by which they are secured to the transverse frame members 75. As seen in Figure 4, these sheet members 76 are spaced from one another and are directly below the sides of the U-shaped member 36 and depend for a considerable distance below the transverse frame member 75. They provide bearings, not shown, for the shafts 73 and 74 which extend between the sheets. A horizontal partition 78 is secured at its ends to the transverse frame members 75 and extends between the conveyors 62 and 63. A vertical partition 79 depends from the horizontal partition 78 between the conveyors 62 and 63 along one side thereof and somewhat along the bottom. A vertical wall 80 extends between the sheets 76 along the vertical partition 79. A pair of inwardly sloping wall members 81 extends from the inner side of the upper end of the wall 80.

As previously stated, the cutting mechanism 35 serves to divide whole potato seeds 25 into quarters 82, two of which fall into adjacent compartments of the conveyor 63 formed by the upstanding portions 66 of the links 64 and the other two of which fall into adjacent compartments of the conveyor 63 formed by adjacent upstanding portions 66 on the links of that conveyor. The horizontal partition 78 between the conveyors 62 and 63 insures the positioning of the seed parts 82, two on one conveyor and two on the other. The conveyors 62 and 63 rotate in the direction of an arrow 83 in Figure 3, and thus the conveyors move down along the side at which the vertical partition 79 is located. The vertical partition 79 serves to maintain the separation of the cut seed parts in one conveyor from those in the other conveyor. As the conveyors descend, the seed parts 82 rest upon the upstanding portions 66 of the conveyor elements 64, and as the conveyors 62 and 63 pass around the sprockets 69 and 72, the angle of the upstanding portions 66 is sufficiently changed so that the seed parts 82 are discharged and fall upon the ground. It will be noted from Figure 3 that the upstanding portion 66 on the conveyor 62 just passing around the idler sprocket 69 extends at a certain angle and that the upstanding portion 66 on the conveyor 63 at the same point extends at a different angle more nearly vertical. The result of this difference is that the upstanding portion 66 on the conveyor 63 discharges the cut seed part 82 carried by it before the upstanding portion 66 on the conveyor 62 discharges the cut seed part 82 carried by it. These two cut seed parts 82 were originally side by side in the compartments on the conveyors 62 and 63 when they were first received from the cutting mechanism 35. Since the two cut seed parts are discharged at different times and are transversely offset from one another with respect to the direction of movement of the planter over the ground, they will be discharged in staggered relation with respect to the direction of movement of the planter. Though the seeds leave the conveyor compartments in staggered relation, they may come to rest in the ground simply in spaced relation along a line determined by the furrow, for the furrow opener, not shown, that forms a furrow as the seed parts are being discharged guides the staggered seeds all into the one furrow, so that they are actually planted in spaced relation generally along a line.

The reason for the difference in angle of the two upstanding portions 66 on the conveyor links just referred to may be understood by reference to Figure 6. The link 64 shown in this figure for the conveyor 62 is so disposed that the body portion 65 of the link extends in one direction from the upstanding portion 66, and the link 64 for the conveyor 63 is so disposed that the body portion 65 extends in the other direction from the upstanding portion 66. Thus, as the links shown in Figure 6 pass around the sprockets 69 and 72, they are displaced from one another in the direction of movement about the sprockets and are tangent to different points on the sprockets. Since the body portions 65 are tangent to different points on the sprockets, they extend at different angles, as shown in Figure 6. Therefore, since the upstanding portions 66 are at right angles to the body portions 65, the upstanding portions 66 necessarily extend at different angles from one another. Thus, as the conveyors 62 and 63 pass horizontally from the idler sprockets 68 and 71 to the driving sprockets 69 and 70, the upstanding portions 66 are directly opposite one another and extend upwardly in the same direction from the body portions 65 to which they are connected. Thus, the compartments on the conveyors 62 and 63 are directly opposite one another in side-by-side relation. However, as the links 64 reach the discharge position at the turn about the idler sprockets 69 and 72, the angle of the upstanding portion 66 on the conveyor 63 is nearer the vertical than the angle of the upstanding portion 66 on the conveyor 62, and so the cut seed part 82 resting against the upstanding portion 66 of the conveyor 63 is discharged before the cut seed part 82 resting against the upstanding portion 66 of the conveyor 62. The result is that cut seed parts are discharged in staggered relation or in spaced relation along the path in the direction of movement of the planter.

Figure 7 illustrates a modified form of conveying means 83 for receiving cut seed parts in directly opposed side-by-side relation and for discharging them upon the ground in staggered relation. This conveying means 83 includes a conveyor 84 trained about a driving sprocket 85 secured to a drive shaft 86 and about idler sprockets 87, 88, and 89 mounted respectively on shafts 90, 91, and 92. The conveying means also includes a conveyor 93 trained about a driving sprocket, not shown, secured to the driving shaft 86 directly behind the driving sprocket 85. The conveyor 93 is also trained about an idler sprocket, not shown, mounted upon the shaft 91 directly behind the sprocket 88 and an idler sprocket 94 mounted upon a shaft 95 somewhat displaced from the shaft 90. There is provided between the conveyors 84 and 93 a horizontal partition 96 and a vertical partition 97 extending along one side of the conveyors and partially below it. The conveyors 84 and 93 are positioned between side sheets 98, of which only one is shown, and there is provided an end wall 99 extending between the sheets 98 at the vertical partition 97. For the conveyor 84 there is provided a sloping wall member 100 secured to the end wall 99. The conveyors 84 and 93 are like the conveyors 62 and 63 in that they are formed of links 64 and 64a, each link 64 comprising a body portion and an upstanding portion, and the link 64a having only a body portion and no upstanding portion. Thus, for each two links of each conveyor, there is formed a seed-receiving compartment between successive upstanding portions.

Attention is now directed to the manner in which the conveyors 84 and 93 extend in respect to one another. Reference character 101 designates a region at which the conveyors 84 and 93 extend in side-by-side relation so that the upstanding portions 66 of one conveyor are directly opposite the upstanding portions of the other conveyor. It is at this region 101 that the conveyors 84 and 93 receive the seed parts 82 directly from a seed-cutting mechanism such as the mechanism 35 illustrated in Figure 3, for it is intended that the conveying means 83 be positioned directly below such a cutting mechanism as is the conveying means 61. Reference character 102 designates a region at which the conveyors 84 and 93 are not in side-by-side relationship. This result is due to the fact that the conveyor 84 is trained about the idler sprocket 89 and thus is displaced from the conveyor 93. At a region 103 the conveyors 84 and 93 are again in side-by-side relationship as they pass about idler sprockets on the shaft 91. At a region 104 the conveyors 84 and 93 are again in out of side-by-side relationship, because the conveyors are trained about the idler sprockets 87 and 94 which are offset from one another. Since the conveyors 84 and 93 are not in side-by-side relationship at the region 102, a greater length is required for the conveyor 84 to pass from the side-by-side region 101 to the side-by-side region 103 than is required for the passage of the conveyor 93 from the region 101 to the region 103. Thus the upstanding portions 66 on the conveyor 84 at the region 103 are not directly opposite the upstanding portions 66 on the conveyor 93. The cut seed parts 82 are discharged from the conveyors 84 and 93 as the conveyors reach the region 103. Since the upstanding portion 66 of one conveyor is displaced from the upstanding portion 66 of the other conveyor at this region, the cut seed parts carried by one conveyor will be discharged at different times from those at which the cut seed parts are discharged. Thus as in the case of the conveying means 61 of Figure 3, the conveying means 83 of Figure 7 receives the cut seed parts directly from a cutting mechanism in directly opposed side-by-side relation and discharges them in spaced relation along the path in the line of movement of the planter. Since the conveyors 93 and 84 are out of side-by-side relation at the region 104, the upstanding portions 66 of the conveyors may again move into directly opposed relation at the region 101.

In the case of the conveying means 61, it is necessary that the body portions 65 on one conveyor extend in one direction from the upstanding portions 66, and that the body portion 65 of the other conveyor extend in the opposite direction from the upstanding portions 66, as illustrated in Figure 6. This is unnecessary in the case of the conveying means 83.

Figure 8 illustrates a third form of conveying means 105. This conveying means comprises a conveyor 106 and another conveyor which is not shown, since it is directly behind the conveyor 106. The conveyor 106 is trained over a drive sprocket 107 and idler sprockets 108 and 109. The sprockets 107, 108, and 109 are mounted respectively upon drive shaft 110 and shafts 111 and 112. The conveyor directly behind the conveyor 106 is trained about sprockets not shown mounted upon the shafts 108, 109, and 110 directly behind the sprockets upon the shafts 110, 111, and 112. A horizontal partition 113 and a vertical partition 114 extend between the conveyors. An end wall 115 extends between side sheets 116, only one being shown, at the vertical partition 114. Both the conveyor 106 and the conveyor directly behind it are formed of links 64 and 64a, which are similar to the correspondingly numbered links of the conveyors 62 and 63 in that each link 64 has a body portion 65 and an upstanding portion 66 at one end, and each link 64ª has only a body portion. The conveying means 105 is adapted to be positioned directly below a cutting mechanism for receiving cut seed parts directly therefrom. The upstanding portions 66 on the conveyors are directly opposite one another so that there are provided seed-receiving compartments directly opposite one another, and this directly opposite relationship of the compartments is maintained throughout the travel of the conveyors. Discharge of the cut seed parts from the conveyors in spaced relation along a path in the direction of movement of the planter is brought about by discharge members associated with the conveyors which cause the cut seed part in a compartment of one conveyor to be discharged at a different time from the cut seed part in the directly opposite compartment of the other conveyor. For the conveyor 106 there is provided a discharge member 117 which is positioned adjacent the lower ends of the vertical partition 114 and the end wall 115 and has an opening 118 through which the cut seed parts are discharged from the upstanding portions 66 on the conveyor 106. At the other side of the vertical partition 114, there is positioned a discharge member 119 for the other conveyor adjacent the lower end of the end wall 115. The discharge member 119 has an opening 120 through which cut seed parts are discharged from the upstanding portions 66 on the conveyor behind the conveyor 106. As will be seen from Figure 8, the discharge member 119 is considerably displaced to the left from the discharge member 117 and has a sloping inner surface 121 with which the upstanding portions 66 of the conveyor behind the conveyor 106 stay in contact or nearly so during a portion of the turn of the conveyor about the lower sprocket. Thus each seed part on the conveyor 106 is discharged sooner than the directly opposed seed part on the conveyor behind the conveyor 106. The result is that the seed parts are discharged in staggered relation and fall into a furrow in spaced relation in a generally straight line determined by the furrow.

It will be apparent from the foregoing description that there have been provided several forms of a new and novel planter. More specifically the novelty resides in the conveying means for receiving cut seed parts directly from a cutter and conveying them to the ground. The three forms are such that they receive the cut seed parts in side-by-side relation and discharge these parts so that they are deposited upon the ground in spaced relation along the path extending in the line of movement of the planter. The various forms of the conveyors are not to be considered limited to use with a cutter mechanism, for they may be applied to planters which do not involve cutting mechanism or the planting of cut seed parts. The invention is also not limited to the specific forms of conveying means shown in combination with the seed-cutting mechanism, for it is novel to position a conveying means in relation to a seed-cutting mechanism so that it receives seed directly from the cutting mechanism and conveys it to the ground.

As has been previously stated, the cut seed parts leave the conveyor compartments in staggered relation and come to rest on the ground in spaced relation along a line if they are guided into a furrow narrow enough to keep the seeds parts in a straight line. Various claims state that the seed parts are deposited in spaced relation along a line, and it is to be understood that the description covers depositing the seed parts either in spaced relation truly along a line or in staggered relation along a line.

The intention is to limit the invention only within the scope of the appended claims.

What is claimed is:

1. In a planter, a supporting means, a cutter for cutting seeds into parts, means mounting the cutter on the supporting means, a pair of conveyors having upstanding portions dividing them into successive compartments in the direction of movement of the conveyors and being positioned in side-by-side relationship immediately adjacent the cutter to receive the cut seed parts directly therefrom, means mounting the conveyors on the supporting means, means moving the conveyors in the same direction to a common point of discharge for delivery of the seed parts on the ground along the same line in spaced relation, a stationary partition positioned between the conveyors at the region of adjacency of the conveyors to the cutter for cooperating with the upstanding portions of the conveyors to insure the placing of just one cut seed part in each compartment, and means mounting the partition on the supporting means.

2. In a planter, a supporting means, a cutter for cutting seeds into parts, means mounting the cutter on the supporting means, a pair of conveyors having upstanding portions dividing them into successive compartments in the direction of movement of the conveyors and extending from a region of side-by-side relationship directly below the cutter to a point near the ground so as to be adapted to receive cut seed parts directly from the cutter immediately upon the cutting of the seeds and to convey the cut seed parts to a point of discharge near the ground and for delivery in spaced relation in the same row, means mounting the conveyors on the supporting means, means moving the conveyers in the same direction, a stationary partition positioned directly below the cutters between the conveyors for cooperating with the upstanding portions of the conveyors to insure the placing of just one cut seed part in each compartment, and means mounting the partition on the supporting means.

3. In a planter, a supporting means, a cutter for cutting seeds each into four parts, means mounting the cutter on the supporting means, a pair of conveyors having successive compartments in the direction of movement of the conveyors and extending in side-by-side relationship from immediately adjacent the cutter to receive the cut seed parts therefrom, two of the four parts of each cut seed in successive compartments in one conveyor and the other two parts in successive compartments of the other conveyor, and means mounting the conveyors on the supporting means.

4. In a planter, a supporting means, a cutter for cutting seeds each into four parts, means mounting the cutter on the supporting means, a pair of conveyors having successive compartments in the direction of movement of the conveyors and extending in side-by-side relationship from directly below the cutter to a point near the ground so as to be adapted to receive cut seed parts, two parts of each cut seed in successive compartments of one conveyor and the other two parts in successive compartments of the other conveyor, and to convey the cut seed parts to a point of discharge near the ground, and means mounting the conveyors on the supporting means.

5. In a planter, a supporting means, a cutter for cutting seeds each into four parts, means mounting the cutter on the supporting means, a pair of conveyors having upstanding portions dividing them into successive compartments in the direction of movement of the conveyors and being positioned in side-by-side relationship immediately adjacent the cutter to receive the cut seed parts directly therefrom, means mounting the conveyors on the supporting means, a stationary partition positioned between the conveyors at the region of adjacency of the conveyors to the cutter for cooperating with the upstanding portions of the conveyors to insure the placing of two parts of one seed in successive compartments of one conveyor and the other two parts of the said one seed in the successive compartments of the other conveyor, and means mounting the partition on the supporting means.

6. In a planter, a supporting means, a cutter for cutting seeds each into four parts, means mounting the cutter on the supporting means, a pair of conveyors having upstanding portions dividing them into successive compartments in the direction of movement of the conveyors and extending from a region of side-by-side relationship directly below the cutter to a point near the ground so as to be adapted to receive cut seed parts directly from the cutter immediately upon the cutting of the seeds and to convey the cut seed parts to a point of discharge near the ground, means mounting the conveyors on the supporting means, a stationary partition positioned directly below the cutters between the conveyors for cooperating with the upstanding portions of the conveyors to insure the placing of two parts of one seed in successive compartments of one conveyor and the other two parts of the said one seed in the successive compartments of the other conveyor, and means mounting the partition on the supporting means.

7. In a planter, a supporting means, a cutting device comprising a pair of intersecting blades, a guide for directing a seed to the intersection of the blades, and a reciprocating presser for forcing the seed onto the blades to divide it into four parts, means mounting the cutting device on the supporting means, a pair of conveyors having upstanding portions dividing them into successive compartments in the direction of movement of the conveyors and extending in side-by-side relationship from directly below the blades to a point near the ground so as to be adapted to receive cut seed parts directly from the blades immediately upon the cutting of the seed and to convey the cut seed parts to a point of discharge near the ground, means mounting the conveyors on the supporting means, a stationary partition positioned directly below the blades between the conveyors for cooperating with the upstanding portions of the conveyors to insure the placing of two parts of the cut seed in successive compartments of one conveyor and the other two parts of the cut seed in successive compartments of the other conveyor, and means mounting the partition on the supporting means.

8. In a planter, a frame adapted to be moved over the ground, a cutter for cutting seeds into parts, means mounting the cutter on the frame, a pair of endless conveyors extending from a region of side-by-side relation adjacent the cutter to a point of discharge near the ground for receiving directly from the cutter seed parts, in directly opposite side-by-side relation, and discharging the seed parts in spaced relation along the same path in the direction of movement of the frame over the ground, means for driving the conveyors in the same direction, and means mounting the conveyors on the frame.

9. In a planter, a frame adapted to be moved over the ground in a certain direction, a cutter for cutting seeds into parts, means mounting the cutter on the frame, a pair of conveyor loops extending in the same direction in side-by-side relationship from adjacent the cutter to a discharge point at a turn in the loops and being formed of links of which at least some have at one end upstanding portions dividing the conveyors into compartments, the links and upstanding portions of one conveyor loop being directly opposite the links and upstanding portions of the other conveyor loop at the region of adjacency to the cutter so as to bring the compartments of one conveyor loop directly opposite the compartments of the other conveyor loop, each link with an upstanding portion on one conveyor loop extending in one direction from the upstanding portion, and each link with an upstanding portion on the other conveyor loop extending in the opposite direction from the upstanding portion so as to cause the upstanding portions on the links of one conveyor loop to assume a different angle at the turn at the discharge point from the angle assumed by the upstanding portions of the links of the other conveyor loop at the discharge point, whereby the conveyor loops receive from the cutter cut seed parts directly opposite one another in the directly opposed compartments of the two conveyor loops and discharge the cut seed parts at the discharge point in spaced relation because of the aforementioned difference in angle of the upstanding portions on the conveyor loops, and means mounting the conveyor loops on the supporting frame.

10. The planter specified in claim 9 and further including a stationary partition positioned between the conveyor loops at their region of adjacency to the cutter and serving to insure the positioning of one seed part to each compartment of the conveyor loops and means mounting the partition on the frame.

11. In the planter specified in claim 9, the cutter serving to divide each seed into four parts, two of which are received in successive compartments of one conveyor loop and the other two, in successive compartments of the other conveyor loop directly opposed to the said successive compartments of the said one conveyor loop.

12. In the planter specified in claim 9, the cutter serving to divide each seed into four parts, two of which are received in successive compartments of one conveyor loop and the other two, in successive compartments of the other conveyor loop directly opposed to the said successive compartments of the said one conveyor loop, the planter further including a stationary partition positioned between the conveyor loops at their region of adjacency to the cutter and serving to insure the positioning of one seed part to each compartment of the conveyor loops and means mounting the partition on the frame.

13. In a planter, a frame adapted to move over the ground in a certain direction, a cutter for cutting seeds into parts, means mounting the cutter on the frame, a pair of conveyor loops of unequal length having seed-part-holding compartments and extending first side-by-side with the compartments of one conveyor loop being directly opposite those of the other conveyor loop at a region of adjacency of the cutter for receiving cut seed parts from the cutter, then not side-by-side for a considerable distance, then side-by-side with the compartments of one conveyor loop staggered with respect to those of the other conveyor loop at a discharge region for discharging cut seed parts in spaced relation along a path in the direction of movement of the frame, then not side-by-side for a considerable distance, and finally side-by-side at the region of adjacency to the cutter, and means mounting the conveyor loops on the frame.

14. The planter specified in claim 13 and further including a stationary partition positioned between the conveyor loops at their region of adjacency to the cutter and serving to insure the positioning of one seed part to each compartment of the conveyor loops and means mounting the partition on the frame.

15. In the planter specified in claim 13, the cutter serving to divide each seed into four parts, two of which are received in successive compartments of one conveyor loop and the other two, in successive compartments of the other conveyor loop directly opposed to the said successive compartments of the said one conveyor loop and further including a stationary partition positioned between the conveyor loops at their region of adjacency to the cutter and serving to insure the positioning of one seed part to each compartment of the conveyor loops and means mounting the partition on the frame.

16. In the planter specified in claim 13 and further including a stationary partition positioned between the conveyor loops at their region of adjacency to the cutter and serving to insure the positioning of one seed part to each compartment of the conveyor loops and means mounting the partition on the frame.

17. In a planter, a frame adapted to move over the ground in a certain direction, a cutter for cutting seeds into parts, means mounting the cutter on the frame, conveying means extending from adjacent the cutter to a discharge region for receiving cut seed parts into two lines on the conveying means, means mounting the conveying means on the frame, means providing adjacent the discharge region discharge openings spaced from one another in the direction of movement of the frame and transversely to said direction for causing the two lines of seed parts to be discharged in spaced relation along a path in the direction of movement of the frame, and means mounting the conveying means on the frame.

18. In the planter specified in claim 17, the cutter dividing each seed into four parts.

19. In a planter, a frame adapted to move over the ground in a certain direction, a cutter for cutting seeds into parts, means mounting the cutter on the frame, a pair of conveyors extending side-by-side in the line of movement of the frame from adjacent the cutter to a discharge region for receiving cut seed parts and conveying them in two lines to the discharge region, means mounting the conveyors on the frame, a stationary partition positioned between the conveyors adjacent the cutter for insuring the receiving of seed parts in two lines by the conveyors, means mounting the partition on the frame, means providing at the discharge region a pair of discharge openings spaced from one another in the line of movement of the frame and transversely thereof for causing the two lines of seed parts to be discharged in spaced relation along a path in the line of movement of the frame, and means mounting the last-mentioned means on the frame.

20. In the planter specified in claim 19, the cutter being adapted to divide each seed into four parts which are received on the two conveyors, two parts in successive compartments of one conveyor, the other two parts in successive compartments of the other conveyor directly opposed to the said successive compartments of the said one conveyor.

21. In the planter specified in claim 19, the cutter being adapted to divide each seed into four parts which are received on the two conveyors, two parts in successive compartments of one conveyor, the other two parts in successive compartments of the other conveyor directly opposed to the said successive compartments of the said one conveyor, the planter further including a stationary partition positioned between the conveyors at their region of adjacency to the cutter for insuring the placing of a cut seed part in each compartment of the conveyors.

22. In a planter, a frame adapted to move over the ground in a certain direction, a conveying means comprising two lines of seed-receiving compartments extending to a discharge point from a receiving point at which the compartments of one line are directly opposed to the compartments of the other line, means mounting the conveying means on the frame, means for causing at the discharge point the discharge of seeds from the conveying means in spaced relation along a path in the line of movement of the frame, and means mounting the last-mentioned means on the frame.

23. The planter specified in claim 22 and further including a stationary partition positioned between the lines of compartments at the receiving point for the insuring of the distribution of the seeds one to each compartment of the two lines and means mounting the partition on the frame.

24. In a planter, a frame adapted to move over the ground in a certain direction, a conveying means comprising two lines of seed-receiving compartments extending to a discharge point from a receiving point at which the compartments of one line are directly opposed to the compartments of the other line, means mounting the conveying means on the frame, means providing at the discharge point a pair of discharge openings displaced from one another in the line of movement of the frame and transversely of the line of movement for causing seeds to be discharged from the conveying means in spaced relation along a path in the line of movement of the frame, and means mounting the last-mentioned means on the frame.

25. In a planter, a frame adapted to be moved over the ground in a certain direction, a pair of conveyor loops extending in the same direction in side-by-side relation from a receiving point to a discharge point at a turn in the loops and being formed of links having at one end upstanding portions dividing the conveyor loops into compartments, the links and upstanding portions of one conveyor loop being directly opposite the links and upstanding portions of the other conveyor loop at the receiving point so as to bring the compartments of one conveyor loop directly opposite the conveyor loops of the other conveyor loop, each link of one conveyor loop extending in one direction from the end having the upstanding portion and each link of the other conveyor loop extending in the opposite direction from the end having the upstanding portion so as to cause the upstanding portion of each link of one conveyor loop to assume at the turn at the discharge point a different angle from the angle assumed by the upstanding portion of each link of the other conveyor loop at the turn at the discharge point, whereby the conveyor loops receive seeds directly opposite one another in the compartment of the two conveyor loops and discharge the seeds in spaced relation along a path in the line of movement of the frame because of the aforementioned difference in angle of the upstanding portions on the conveyor loops, and means mounting the conveyor loops on the frame.

26. In a planter, a frame adapted to move over the ground in a certain direction, a pair of conveyor loops of unequal length having seed-part-holding compartments and extending first side-by-side with the compartments of one conveyor loop directly opposite those of the other conveyor loop at a receiving point for receiving seeds, then not side-by-side for a considerable distance, then side-by-side with the compartments of one conveyor loop staggered with respect to those of the other conveyor loop at a discharge region for discharging seeds in staggered relation along a path in the direction of movement of the frame, then not side-by-side for a considerable distance, and finally side-by-side at the receiving point to the cutter, and means mounting the conveyor loops on the frame.

27. In a planter, a frame adapted to move over the ground in a certain direction, a cutter for cutting seeds into parts, means mounting the cutter on the frame, a pair of conveyor loops of unequal length having seed-part-holding compartments, the compartments of one conveyor loop being directly opposite those of the other conveyor loop at a region of adjacency of the cutter for receiving cut seed parts from the cutter and staggered with respect to those of the other conveyor loop at a discharge region for discharging cut seed parts in spaced relation.

LEWIS E. SMITH.